(12) United States Patent
Stijnman et al.

(10) Patent No.: US 12,043,523 B2
(45) Date of Patent: Jul. 23, 2024

(54) CRANE, VESSEL COMPRISING SUCH A CRANE, AND A METHOD FOR UP-ENDING AN ELONGATE STRUCTURE

(71) Applicant: ITREC B.V., Schiedam (NL)

(72) Inventors: Theodorus Cornelis Joanes Maria Stijnman, Schiedam (NL); Cornelis Martinus Van Veluw, Schiedam (NL)

(73) Assignee: ITREC B.V., Schiedam (NL)

( * ) Notice: Subject to any disclaimer, the term of this patent is extended or adjusted under 35 U.S.C. 154(b) by 231 days.

(21) Appl. No.: 17/788,236

(22) PCT Filed: Dec. 22, 2020

(86) PCT No.: PCT/EP2020/087679
§ 371 (c)(1),
(2) Date: Jun. 22, 2022

(87) PCT Pub. No.: WO2021/130254
PCT Pub. Date: Jul. 1, 2021

(65) Prior Publication Data
US 2023/0331522 A1     Oct. 19, 2023

(30) Foreign Application Priority Data
Dec. 23, 2019   (NL) ...................................... 2024563

(51) Int. Cl.
*B66C 23/18*   (2006.01)
*B66C 13/08*   (2006.01)
(Continued)

(52) U.S. Cl.
CPC ............ *B66C 13/08* (2013.01); *B66C 23/185* (2013.01); *B66C 23/52* (2013.01); *B66D 3/08* (2013.01); *E02B 17/08* (2013.01)

(58) Field of Classification Search
CPC ......... B66C 23/185; B66C 23/52; B66C 3/08; B66C 13/08; E02B 17/08
See application file for complete search history.

(56) References Cited

U.S. PATENT DOCUMENTS 6,651,961 B1   11/2003   Meyer
8,701,904 B2 *   4/2014   Roodenburg ........... B66C 23/52
                                                        212/175

(Continued)

FOREIGN PATENT DOCUMENTS

DE          27 47 069 A1    4/1978
WO     WO 2017/217845 A1   12/2017
WO     WO 2018/052291 A1    3/2018

OTHER PUBLICATIONS

International Search Report for PCT/EP2020/087679 (PCT/ISA/210) mailed on Mar. 23, 2021.

(Continued)

*Primary Examiner* — Michael R Mansen
*Assistant Examiner* — Juan J Campos, Jr.
(74) *Attorney, Agent, or Firm* — Birch, Stewart, Kolasch & Birch, LLP (57) ABSTRACT

A crane with a pivotal boom. The crane has a first and a second main hoisting system, which main hoisting system are configured for independent operation. Each system comprises a hoisting cable, an upper sheave block, a hoisting block assembly suspended from the upper sheave block by the hoisting cable in a multiple fall configuration, and a hoisting winch. The upper sheave blocks of the first and second main hoisting systems are each independently pivotable about a common pivot axis relative to the boom. Each hoisting block assembly comprises a hoisting block body, multiple fixed sheaves that are fixed on the hoisting block body, and multiple disconnectable sheave members, each (Continued)

disconnectable sheave member comprising a frame and at least one sheave rotatably supported by the frame.

17 Claims, 9 Drawing Sheets

(51) Int. Cl.
*B66C 23/52* (2006.01)
*B66D 3/08* (2006.01)
*E02B 17/08* (2006.01)

(56) References Cited

U.S. PATENT DOCUMENTS

| | | | |
|---|---|---|---|
| 10,544,016 B2* | 1/2020 | Roodenburg | B66C 23/52 |
| 10,906,785 B2* | 2/2021 | Van Wingerden | F03D 1/0658 |
| 2010/0294737 A1* | 11/2010 | Roodenburg | B66C 23/82 |
| | | | 212/294 |
| 2015/0337798 A1* | 11/2015 | Clymans | F03D 13/10 |
| | | | 29/889 |
| 2019/0248631 A1* | 8/2019 | Roodenburg | B66C 23/84 |
| 2019/0345011 A1* | 11/2019 | Van Wingerden | B66C 23/52 |

OTHER PUBLICATIONS

Written Opinion of the International Searching Authority for PCT/EP2020/087679 (PCT/ISA/237) mailed on Mar. 23, 2021.

* cited by examiner

CRANE, VESSEL COMPRISING SUCH A CRANE, AND A METHOD FOR UP-ENDING AN ELONGATE STRUCTURE

FIELD OF THE INVENTION

The invention relates to a crane, a vessel comprising such a crane, and a method for up-ending an elongate structure.

The crane according to the invention is in particular suited for use in the field of offshore wind turbine installation and/or offshore wind turbine maintenance. Current offshore wind turbines require a foundation, e.g. in the form of a monopile. The wind turbine is then installed on the monopile, either in one piece or in several pieces.

BACKGROUND OF THE INVENTION

In order to make efficient use of wind energy, the trend is to increase the diameter of the rotor of the wind turbine. Wind turbine blades of 60-90 m in length or even longer may be very common in the near future, see for instance the Haliade-x 12 MW wind turbine having a rotor of 220 meters. However, this will also increase the size and weight of all other components including the foundation. It is envisaged that long and large diameter monopiles, e.g. weighing over 2000 mt need to be installed. Practical monopiles have been proposed with lengths of about 100 metres or even more.

Regardless of whether the wind turbine is installed on land or offshore, transporting the monopile to the installation site will mostly be done with the monopile in a substantially horizontal orientation. In order to drive the monopile into the earth, the monopile needs to be up-ended by a crane to be brought in the desired vertical orientation.

Many offshore wind turbine installation vessels are of the jack-up type, with extensible legs and with a crane for installation of the wind turbine, including the foundation thereof. In a known design, the crane is an around-the-leg crane.

Prior art solutions known in the practice of up-ending the monopile comprise methods in which a crane only lifts the upper end of the monopile and the lower end remains supported by the ground or on a deck of the vessel, e.g. by a tilting support frame. A drawback of this method is that control of the lower end is quite challenging, especially when the lower end needs to move relative to the ground or deck, e.g. for overboarding the monopile. Further, up-ending can usually only be done at a limited number of locations where there is enough space for up-ending the monopile with the crane.

In WO2017/217845, the FIG. 18 shows a crane using two separate main hoisting systems to manipulate the upper end and lower end of the monopile respectively in the course of an up-ending process.

In WO2018/052291 a crane is disclosed wherein the boom comprises an A-frame with two boom legs that are connected at one end to the crane housing and at the opposite end to each other via a hammerhead structure. The crane has three separate main hoisting systems. Each main hoisting system comprises:
 a hoisting cable;
 an upper sheave block with one or more sheaves that are rotatable about a sheave rotation axis, which upper sheave block is arranged on the hammerhead structure of the boom;
 a hoisting block suspended from the upper sheave block by the hoisting cable; and
 a hoisting winch to lift and lower the hoisting block by hauling in or paying out the hoisting cable.

Herein, the upper sheave block of each main hoisting system is pivotable about a pivot axis relative to the boom, which axis is parallel to the pivot axis of the boom. The sheave rotation axis of the one or more sheaves of the upper sheave block is perpendicular to the respective pivot axis of the upper sheave block. In this known crane, the upper sheave blocks of the three main hoisting systems are arranged side-by-side. The WO2018/052291 discloses methods for upending a monopile, e.g. as is disclosed with reference to FIGS. 11-13 therein. In said figures, it is shown that two of the three main hoisting systems are combined to increase the hoisting capacity required for the upper end of the monopile, while the remaining hoisting system is to manipulate the lower end in the upending process.

OBJECT OF THE INVENTION

The present invention aims to provide an improved solution for up-ending elongate structures, e.g. the monopile or the tower of a wind turbine. For example, it is desirable to avoid the need to provide an intermediate connection member between the two hoisting blocks of the combined hoisting systems on the one hand and the tool that is engaged with the upper end of the monopile on the other hand, as shown in FIG. 11 of WO2018/052291.

SUMMARY OF THE INVENTION

The present invention proposes a crane according to claim 1. In the inventive crane, there are a first main hoisting system and a second main hoisting system. Each of these main hoisting systems is configured for independent operation. Each main hoisting system comprises:
 a hoisting cable;
 an upper sheave block with sheaves that are rotatable about a sheave rotation axis, which upper sheave block is arranged on the boom;
 a hoisting block assembly suspended from the upper sheave block by the hoisting cable in a multiple fall configuration; and
 a hoisting winch configured to lift and lower the hoisting block assembly by hauling in or paying out the hoisting cable.

The upper sheave blocks of the first and second main hoisting systems are each independently pivotable about a common pivot axis relative to the boom, which common pivot axis is parallel to the pivot axis of the boom, and wherein the sheave rotation axis of the sheaves of each of the upper sheave blocks is perpendicular to the common pivot axis of the upper sheave blocks.

Each hoisting block assembly comprises:
 a hoisting block body configured to suspend a load from the hoisting block assembly,
 multiple fixed sheaves, that are fixed on the hoisting block body,
 multiple disconnectable sheave members, each disconnectable sheave member comprising a frame and at least one sheave rotatably supported by the frame.

In the inventive crane, the frame of each disconnectable sheave member is provided with a first connector member and the hoisting block body is provided with an associated second connector member, said first and second connector members being configured to provide a releasable connection between the sheave member and the hoisting block body. The frame of each disconnectable sheave member is provided with a first positioning member and the upper sheave block is provided with an associated second positioning member, so that each disconnectable sheave member is selective operable in a hoisting capacity increasing configuration wherein the first and second connector members are interconnected and the disconnectable sheave member is connected to the hoisting block body, or in a hoisting speed increasing configuration, wherein the first and second connector members are disconnected and wherein the first and second positioning members are engaged, so that the disconnectable sheave member rests against the upper sheave block.

Compared to the arrangement disclosed in WO2018/052291 the provision of a third main hoisting system can be dispensed with, as is preferred, as the inventive crane allows to operate the crane with a multiple fall configuration in the first hoisting system that differs from the multiple fall configuration in the second hoisting system, and to select the multiple fall configuration for each main hoisting system in optimal manner for the hoisting job at hand. This is more effective in practice than the combining of two main hoisting systems, e.g. for lifting the upper end of a monopile, as described in WO2018/052291. The inventive system also is more effective compared to the WO2017/217845 as therein the number of effective falls in a main hoisting system is constant, so that no optimization of hoisting capacity and/or hoisting speed can be done in view of a specific hoisting job to be performed.

In an embodiment, the hoisting block body has a length parallel to the sheave rotation axis of the sheaves and has longitudinal ends, wherein a first set of one or more, e.g. a pair, fixed sheaves is arranged in proximity of one longitudinal end (axial end), and wherein a second set of one or more, e.g. a pair, fixed sheaves is arranged in proximity of another longitudinal end, wherein a third set of one or more, e.g. a pair, fixed sheaves is arranged intermediate the first and second sets, and wherein at least one second connector member for a first disconnectable sheave member is arranged between the first and third sets, and wherein at least one second connector member for a second disconnectable sheave member is arranged between the third and second sets.

In an embodiment, the hoisting cable of each main hoisting system has a dead end secured to the boom, and wherein the hoisting cable extends from said dead end to the third set of fixed sheaves, and from there via the upper sheave block to the first disconnectable sheave member, and from there via the upper sheave block to the first set of fixed sheaves, wherein the main hoisting system comprises an equalizer sheave mounted on the upper sheave block, and wherein the hoisting cable extends from the first set of fixed sheaves via the equalizer sheave to the second set of fixed sheaves, and from there via the upper sheave block to the second disconnectable sheave block, and from there via the upper sheave to the third set of fixed sheaves, and from said third set of fixed sheaves to an upper guide block mounted to the upper sheave block, and from there to the hoisting winch.

In an embodiment, the first, second, and third set of fixed sheaves each have two sheaves.

In an embodiment, the first and second disconnectable sheave blocks each have two sheaves, as preferred to be combined with the first, second, and third set of fixed sheaves each having two sheaves.

In an embodiment, the hoisting block body is provided with a protruding spacer and positioning member that extends towards the upper sheave block and wherein the upper sheave block is provided with a cooperating engagement member, so that the hoisting block assembly is hoistable into a storage position in proximity of the upper sheave block wherein the protruding spacer and positioning member abuts the cooperating engagement member, e.g. wherein the protruding spacer and positioning member has a forked end defining an open ended slot, and wherein the cooperating engagement member is configured to be received in the slot. For example, the protruding spacer and positioning member is located in between the sheaves of the third set of fixed sheaves.

In an embodiment, the hoisting block body has parallel and horizontally extending fastening ribs protruding from a lower side of the hoisting block body, said fastening ribs being provided with multiple holes perpendicular to the ribs. For example, the crane comprises a hook connection assembly comprising a horizontal axle supported at ends thereof by a pair of support plates having aligned bores into which the axle extends, said support plates being secured releasably on opposite sides of a fastening rib, wherein the axle has a central vertical bore through which a swivel shaft is suspended, said swivel shaft supporting a crane hook assembly.

In an embodiment, the first and second main hoisting systems have the same multiple fall configuration between the respective upper sheave block and the respective hoisting block assembly, the selective disconnectability of the disconnectable sheave members allowing to provide different numbers of effective falls in the main hoisting systems.

The present invention also relates to a vessel comprising a crane as described herein.

In an embodiment the vessel is a jack-up vessel, as is known in the art and comprising:
a hull, wherein the crane is mounted on the hull,
at least three jack-up legs,
a leg driving device per leg allowing to move the corresponding leg relative to the hull in a vertical direction to allow the hull to be lifted out of the water and/or to stabilize the hull when performing a hoisting activity using the crane.

In an embodiment, the base structure and the crane housing of the crane are arranged around a jack-up leg, so that the crane is a leg-encircling crane.

The present invention also relates to a method for up-ending an elongate structure, wherein use is made of a crane or a vessel as described herein, said method comprising the following steps:
a) providing an elongate structure with a first longitudinal end and a second longitudinal end in a substantially horizontal orientation;
b) connecting the hoisting block assembly of the first main hoisting system to the first longitudinal end or end portion of the elongate structure;
c) connecting the hoisting block assembly of the second main hoisting system to the second longitudinal end or end portion of the elongate structure;
d) operating the respective winches of the first and second main hoisting systems until the elongate structure is in a substantially vertical orientation with the first longitudinal end above the second longitudinal end.

The invention also relates to a method for up-ending a longitudinal structure, wherein use is made of a crane or a vessel as described herein, said method comprising the following steps:
a) providing a longitudinal structure with an upper end and a lower end in a substantially horizontal orientation;

b) connecting the hoisting block assembly of the first main hoisting system to the upper end or end portion of the longitudinal structure;

c) connecting the hoisting block assembly of the second main hoisting system to the lower end or end portion of the longitudinal structure;

d) operating the respective winches of the first and second main hoisting systems until the longitudinal structure is in a substantially vertical orientation with the upper end above the lower end.

In an embodiment, the method comprises:

disconnecting one or more of the disconnectable sheave members from the hoisting block assembly of the second main hoisting system so as to obtain an effective number of falls in the second hoisting system that is lower than the effective number of falls in the first hoisting system.

In an embodiment, the step c) comprises the following steps:

c1) providing a gripping element;

c2) providing the gripping element around the second longitudinal end or end portion of the elongate structure; and c3) connecting the hoisting block assembly of the second main hoisting system to the gripping element.

In an embodiment, the elongate structure is a monopile as foundation of an offshore wind turbine or a tower of a wind turbine.

BRIEF DESCRIPTION OF THE DRAWINGS

The invention will now be explained with reference to the drawings. In the drawings.

DETAILED DESCRIPTION OF THE DRAWINGS

Figure 1:
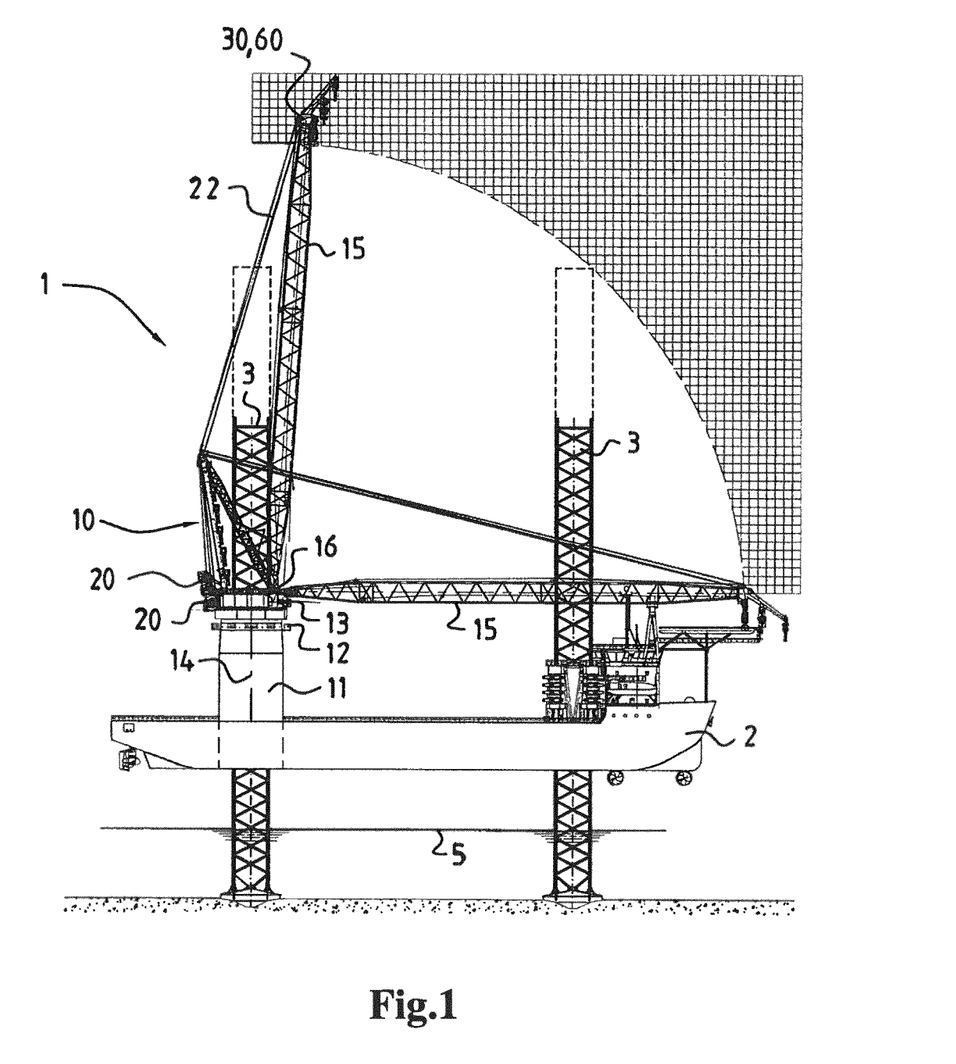
FIG. 1 shows a side view of a vessel with a crane according to an embodiment of the invention.

The vessel 1 of FIG. 1 comprises a hull 2 with four openings in the hull 2, wherein the openings extend vertically through the hull 2 to receive a respective jack-up leg 3.

For each leg 3 a leg driving device 4 is provided allowing to move the corresponding leg 3 up and down relative to the hull 2 in a vertical direction to allow the hull 2 to be lifted out of a water body 5 as shown in FIG. 1. Hence, the exemplary vessel 1 is a jack-up vessel. The height of the legs 3 relative to the hull 2 when the legs are retracted for sailing with the vessel is indicated by dashed lines above the respective legs.

Figure 2:
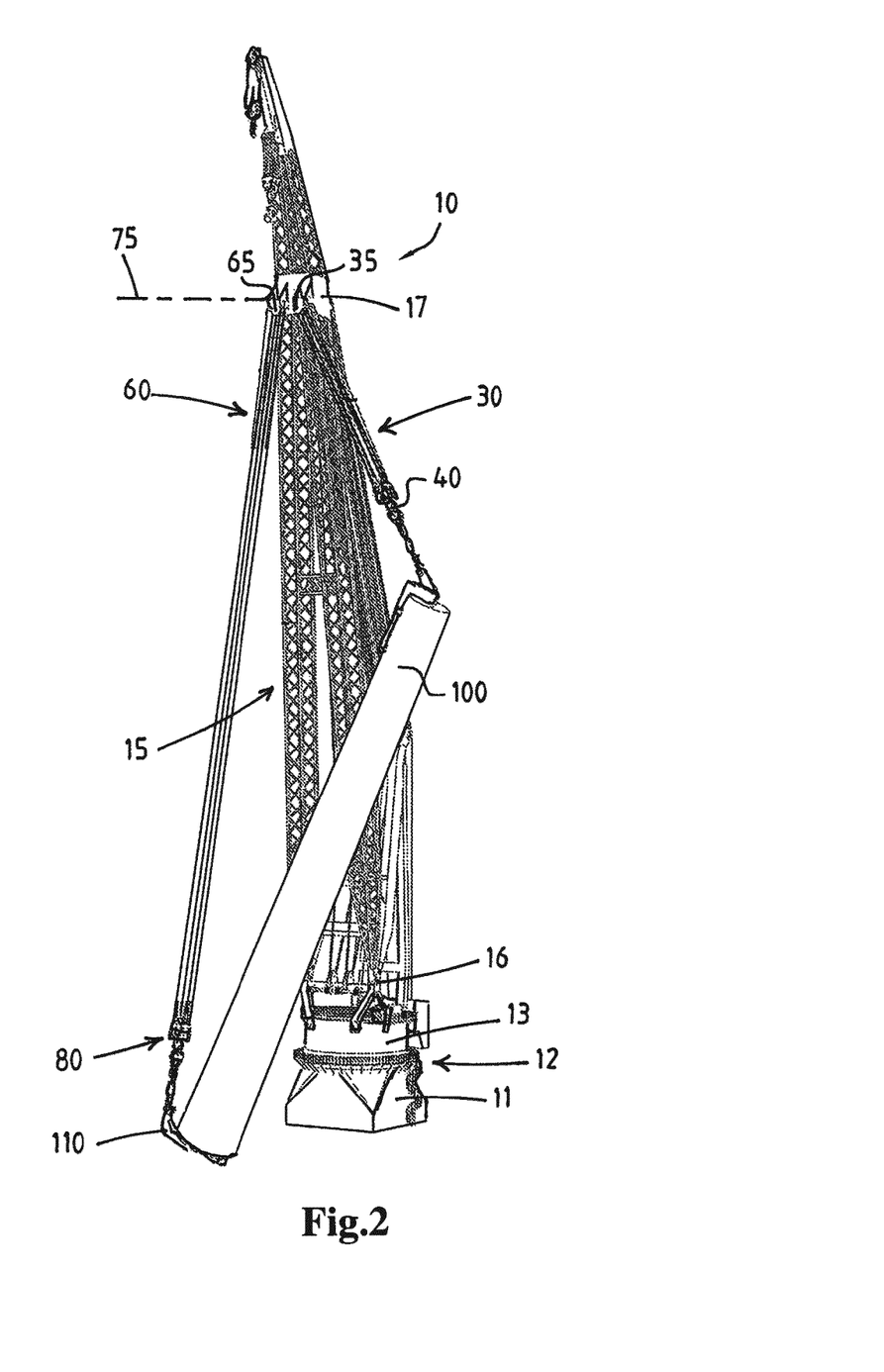
FIG. 2 shows the crane of the vessel of FIG. 1 during upending of a monopile.
Figure 9:
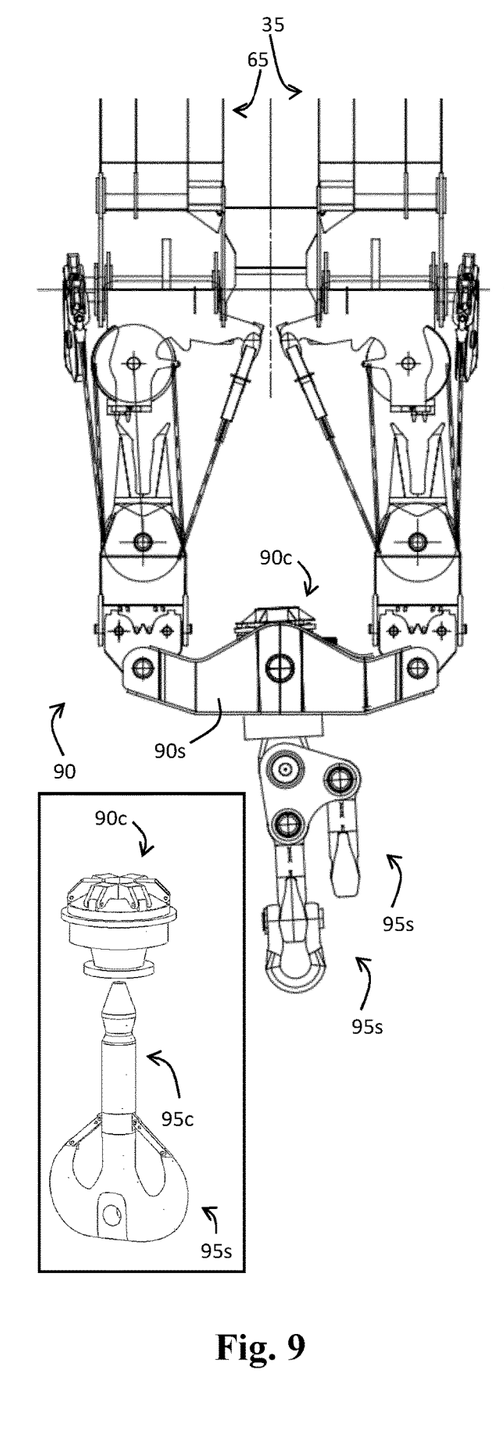
FIG. 9 shows for this embodiment the same main hoisting system in a configuration with a minimum number of effective falls, with the single load suspension configuration.

Provided on the vessel 1 is a crane 10 according to an exemplary embodiment of the invention, shown also individually in FIG. 2. Another crane according to the invention is shown in FIG. 9—with the same crane features as discussed below.

The crane 10 comprises a base structure 11 mounted to the hull 2, a slew bearing 12 and a crane housing 13 moveably mounted to the base structure 11 via the slew bearing 12 to allow the crane housing 13 to slew relative to the base structure 11 about a substantially vertical slewing axis 14.

The crane 10 further comprises a pivotal boom 15. The boom 15 is pivotally mounted to the crane housing 13 to allow the boom 15 to pivot relative to the crane housing 13 about a substantially horizontal first pivot axis 16.

In FIG. 1, the boom 15 is depicted at two distinct angular orientations, a lower transport orientation in which the boom 15 is supported by the vessel at a distance from the horizontal boom pivot axis 16, and an upright hoisting orientation in which the boom 15 is almost vertical.

In FIG. 9, it is illustrated that the boom 15 is supported by the vessel on a boom rest 19 thereof in the lower transport orientation, located at a distance from the horizontal boom pivot axis 16. The boom is furthermore depicted in an intermediate hoisting orientation, pivoted around the first pivot axis 16 at an angle with respect to the lower transport position.

The boom 15 is non-articulated.

The boom 15 comprises an A-frame with two boom legs that are connected at one end to the crane housing so as to be pivotal about the boom pivot axis 16. The latticed boom legs adjoin another in a box structure 17.

The crane 10 further comprises a luffing system to set an angular orientation of the boom 15 relative to the crane housing 13. The luffing system comprises one or more luffing winches 20 on the crane housing 13, and one or more luffing cables 22 extending between the one or more luffing winches 20 and the boom 15.

The crane 10 has, as main hoisting facility, a first main hoisting system 30 and a second main hoisting system 60. These two main hoisting systems 30, 60 are configured for independent operation, e.g. necessary in view of an upending process of which a stage is depicted in FIG. 2.

Figure 3:
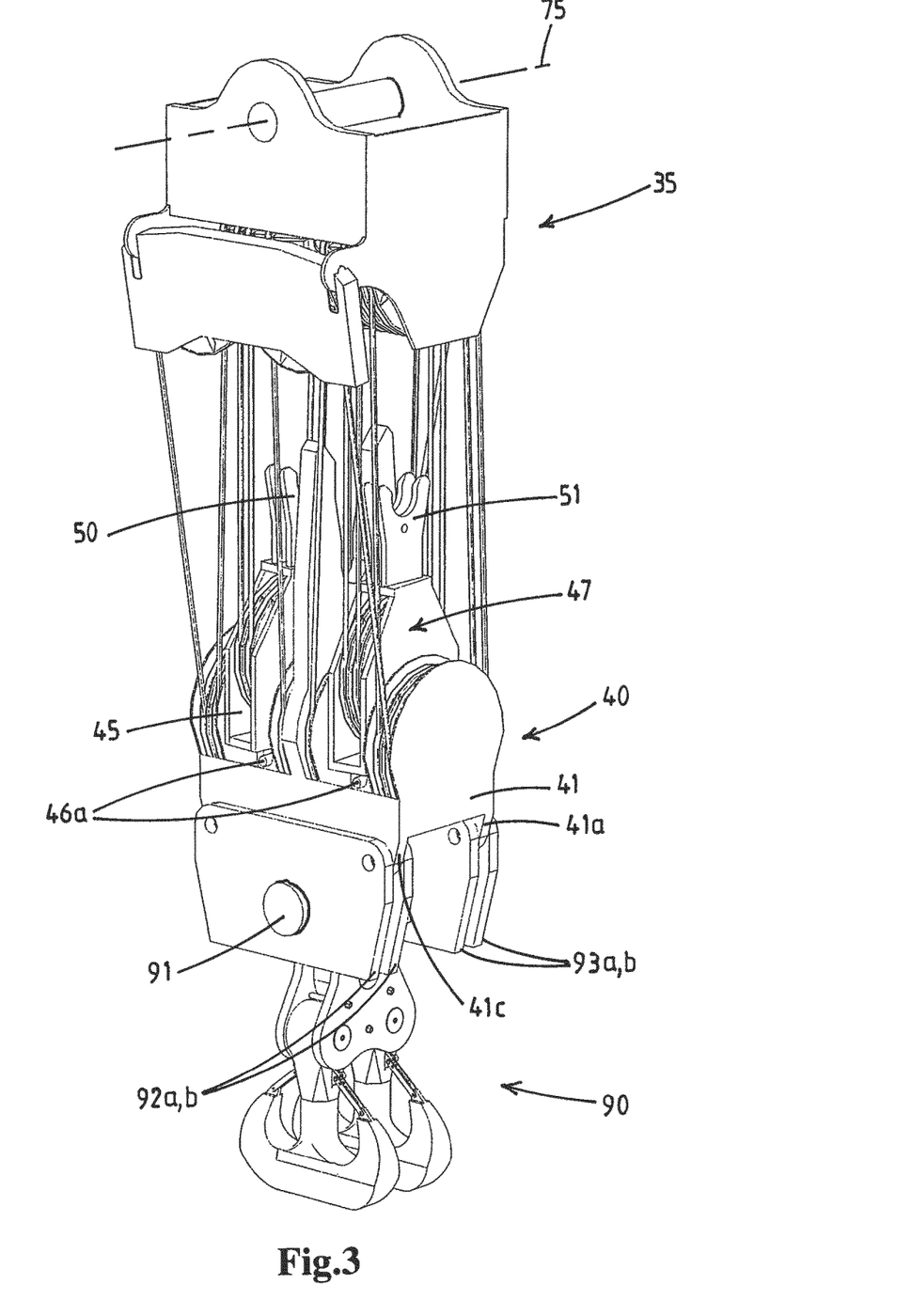
FIG. 3 shows a main hoisting system of the crane of FIG. 1 in a configuration with a maximum number of effective falls.
Figure 4:
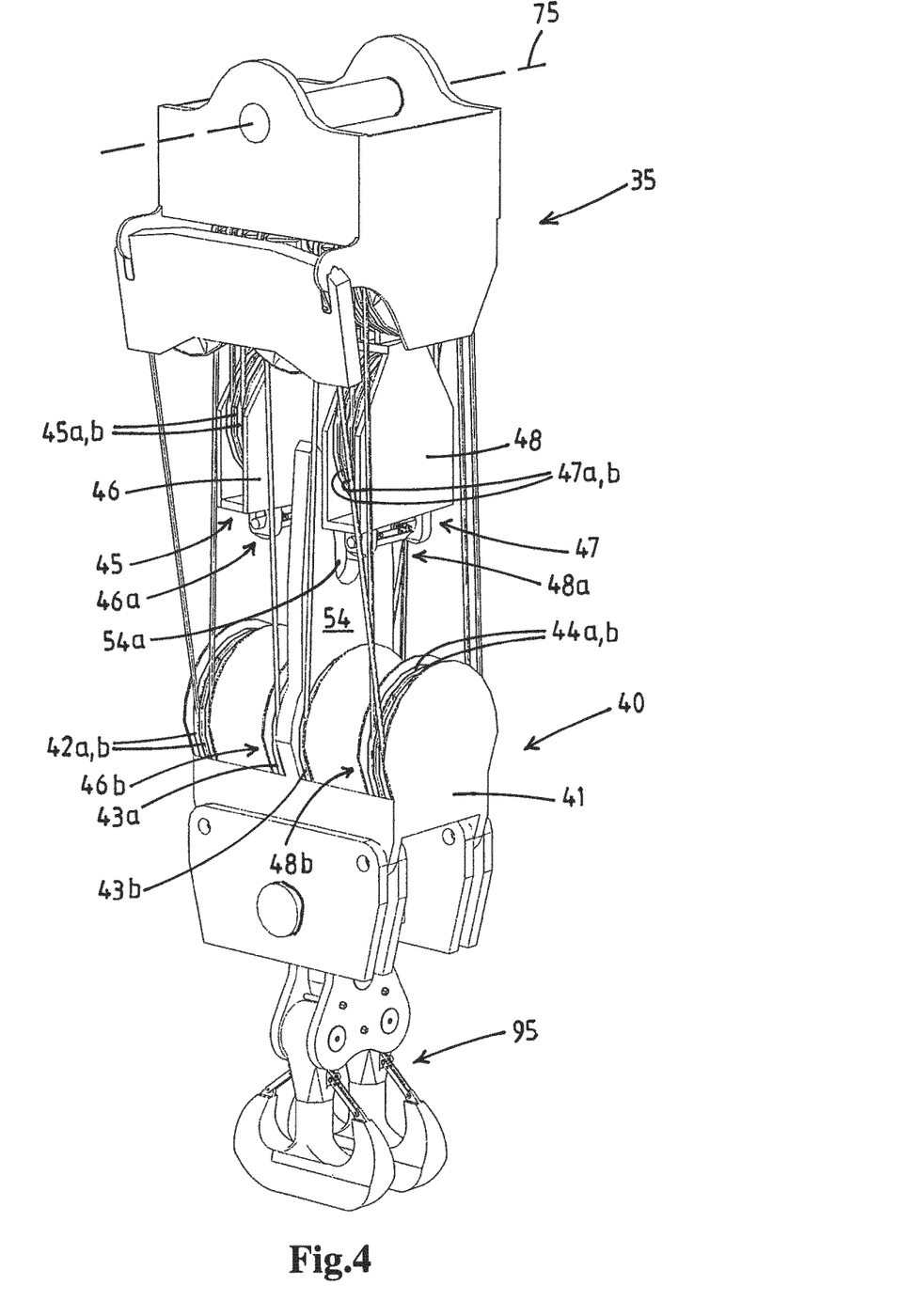
FIG. 4 shows the main hoisting system of FIG. 3 in a configuration with a minimum number of effective falls.

In this description only the first hoisting system 30 is described, as the general layout of the system 60 is the same. FIGS. 3 and 4 show a first embodiment, and FIGS. 5-10 a second. However, as can be verified from the figures, the features according to the invention as described below apply for both embodiments.

The main hoisting system 30 comprises:
a hoisting cable 31;
an upper sheave block 35 with sheaves 36 that are rotatable about a sheave rotation axis 37, which upper sheave block is arranged on the boom 15;
a hoisting block assembly 40 suspended from the upper sheave block 35 by the hoisting cable 31 in a multiple fall configuration; and
a hoisting winch 55 that is configured to lift and lower the hoisting block assembly 40 by hauling in or paying out the hoisting cable 31.

The upper sheave blocks 35, 65 of the first and second main hoisting systems 30, 60 are each independently pivotable about a common pivot axis 75 relative to the boom 15.

This common pivot axis 75 of the upper sheave blocks 35, 65 is parallel to the pivot axis 16 of the boom 15.

The sheave rotation axis 37 of the sheaves 36 of each of the upper sheave blocks 35, 65 is perpendicular to the common pivot axis 75 of the upper sheave blocks 37.

Each hoisting block assembly 40, 70 comprises:
a hoisting block body 41 configured to suspend a load from the hoisting block assembly,
multiple fixed sheaves 42a,b, 43a,b, 44a,b, that are fixed on the hoisting block body,
multiple disconnectable sheave members 45, 47, each disconnectable sheave member comprising a frame 46, 48 and at least one sheave 45a,b, 47a,b rotatably supported by the frame 46, 48.

The frame 46, 48 of each disconnectable sheave member 45, 47 is provided with a first connector member 46c, 48c. The hoisting block body 41 is provided with an associated second connector member 46b, 48b. For example, the first and second connector member are each embodied as a portion forming one or more holes configured to receive a connector pin 46a, 48a, wherein when the sheave member 45, 47 is connected to the block body 41, the holes are aligned with each other and the connector pin 46a, 48a extends through the aligned holes thereby interconnecting the first and second connector members 46c, 46b.

The first and second connector members 46c,b, 48c,b are configured to provide a releasable connection between the sheave member 45, 47 and the hoisting block body 41.

The frame 46, 48 of each disconnectable sheave member 45, 47 is provided with a first positioning member 50, 51. The upper sheave block is provided with an associated second positioning member 52, 53, so that each disconnectable sheave member 45, 47 is selective operable in a hoisting capacity increasing configuration, see FIG. 3, wherein the first and second connector members 46c,b, 48c,b related to the sheave members 45, 47 are interconnected and the disconnectable sheave members are connected to the hoisting block body 41, or in a hoisting speed increasing configuration, see FIG. 4, wherein the first connector members 46c, 48c are disconnected from the second connector members 46b, 48b and wherein the first and second positioning members 50, 51, 52, 53 are engaged, so that the disconnectable sheave member rests against the upper sheave block 35.

As illustrated, the hoisting block body 41 has a length parallel to the sheave rotation axis 41e of the sheaves 42a,b, 43a,b, 44a,b, and has longitudinal ends.

A first set 42a, b of fixed sheaves is arranged in proximity of one longitudinal end. A second set of fixed sheaves 44a, b is arranged in proximity of another longitudinal end. A third set of fixed sheaves 43a, b is arranged intermediate the first and second sets.

A second connector member 46b for a first disconnectable sheave member 45 is arranged between the first set 42a, b and third set 43a,b.

A second connector member 48b for a second disconnectable sheave member 47 is arranged between the third set 43a, b and the second set 44a,b.

Figure 12A:
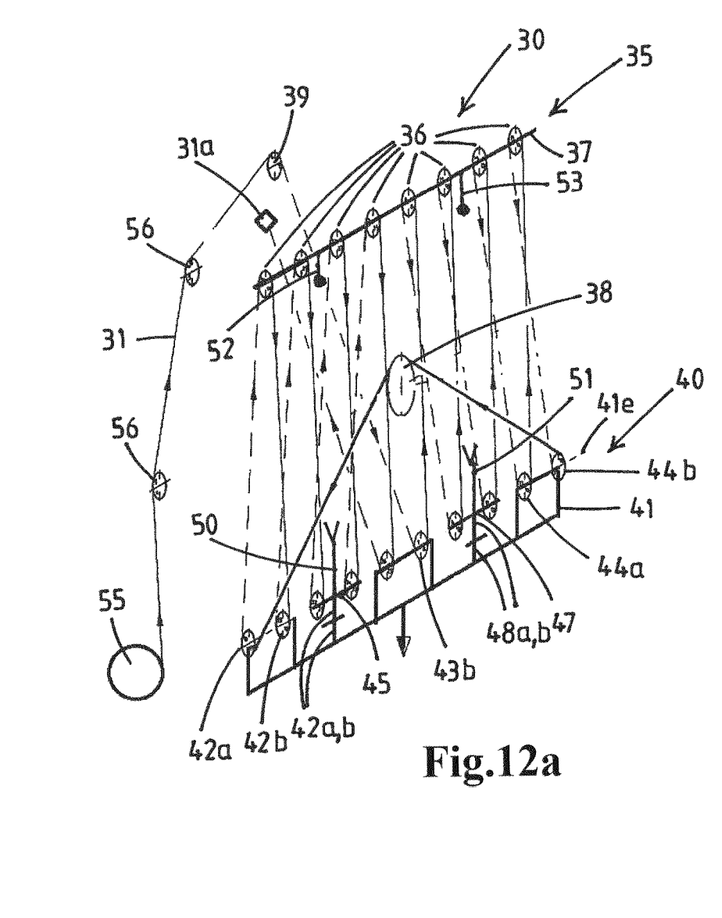
Figure 12B:
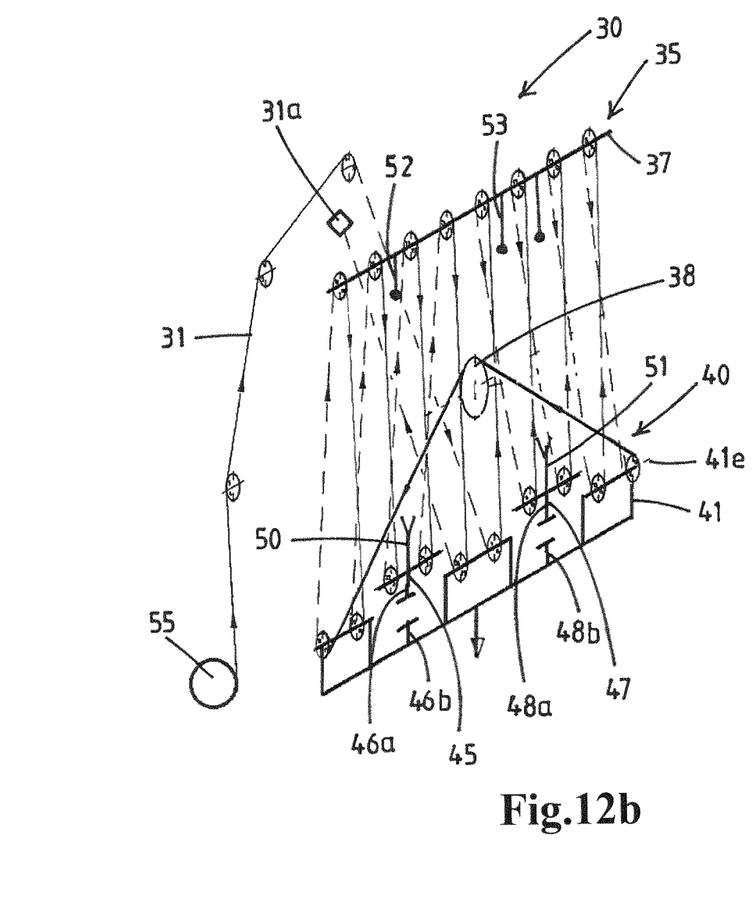

As shown in FIGS. 12a,b the hoisting cable 31 of the main hoisting system 30 has a dead end 31a that is secured to an anchor on the boom 15, e.g. in proximity of the upper sheave block.

The hoisting cable 31 extends from the dead end 31a to the third set 43a, b of fixed sheaves on the block 41, and from there via the upper sheave block 35 to the first disconnectable sheave member 45, and from there via the upper sheave block 35 to the first set 42a,b of fixed sheaves.

The main hoisting system 30 comprises an equalizer sheave 38 that is mounted on the upper sheave block 35.

The hoisting cable 31 extends from the first set 42a, b of fixed sheaves via the equalizer sheave 38 to the second set 44a,b of fixed sheaves, and from there via the upper sheave block 35 to the second disconnectable sheave block 47, and from there via the upper sheave block 35 to the third set 43a, b of fixed sheaves, and from said third set 43a, b of fixed sheaves to an upper guide block 39 mounted to the upper sheave block 35, and from there to the hoisting winch 55, e.g. along the boom 15 with the winch being mounted in proximity of the lower end of the boom 15, e.g. via one or more sheaves 56 on the boom 15.

As illustrated, and as preferred, the first, second, and third set of fixed sheaves each have two sheaves.

As illustrated, and as preferred, the first and second disconnectable sheave blocks 45, 47 each have two sheaves.

It is illustrated that the hoisting block body 41 is provided with a protruding spacer and positioning member 54 that extends towards the upper sheave block 35. The upper sheave block is provided with a cooperating engagement member, so that the hoisting block assembly is hoistable into a storage position in proximity of the upper sheave block wherein the protruding spacer and positioning member abuts the cooperating engagement member.

As shown the protruding spacer and positioning member 54 has a forked end defining an open ended slot 54a. The cooperating engagement member is configured to be received in the slot 54a.

It is illustrated that the protruding spacer and positioning member 54 is located in between the sheaves 43a, b of the third set of fixed sheaves.

FIGS. 3 and 4 illustrate that the hoisting block body 41 has parallel and horizontally extending fastening ribs 41c,d protruding from a lower side of the hoisting block body. These fastening ribs are provided with multiple holes perpendicular to the ribs. The crane comprises a hook connection assembly 90 with a horizontal axle 91 that is supported at each of the ends thereof by a pair of support plates 92a,b, 93a,b having aligned bores into which the axle extends. These support plates 92a,b, 93a, b are secured releasably on opposite sides of a fastening rib 41c,d. The axle 91 has a central vertical bore through which a swivel shaft is suspended, said swivel shaft supporting a crane hook assembly 95.

Figure 5:
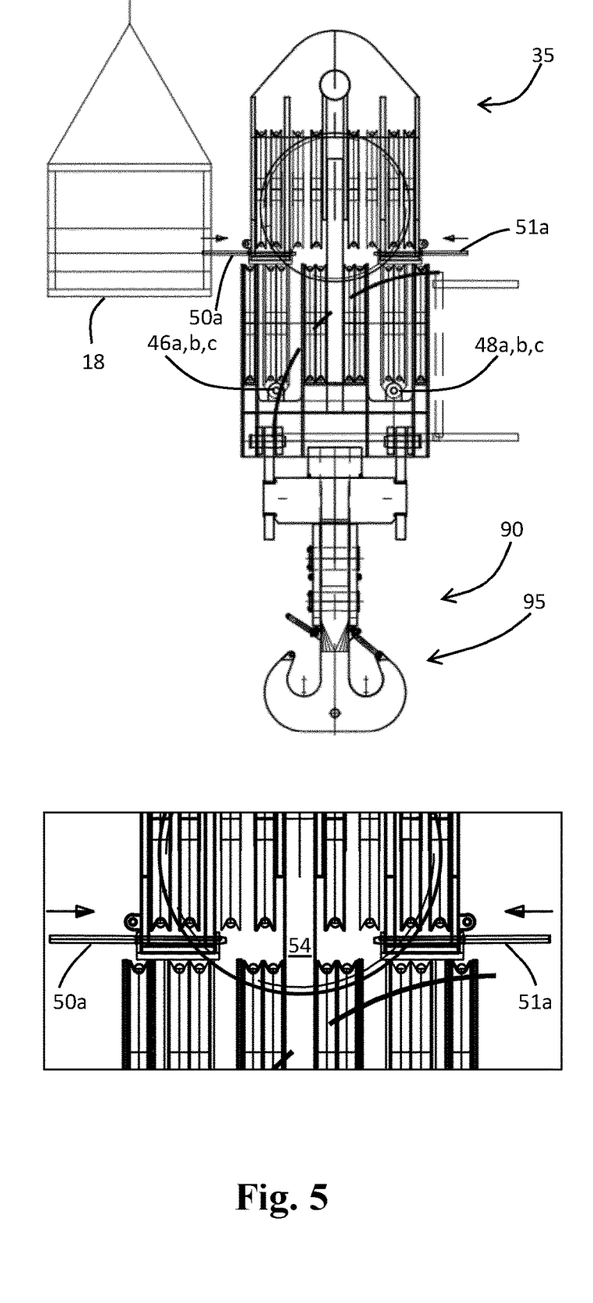
FIG. 5 shows for a second embodiment of the invention, a main hoisting system in a configuration with a maximum number of effective falls, showing both a single and double load suspension configurations in the same figure.
Figure 6:
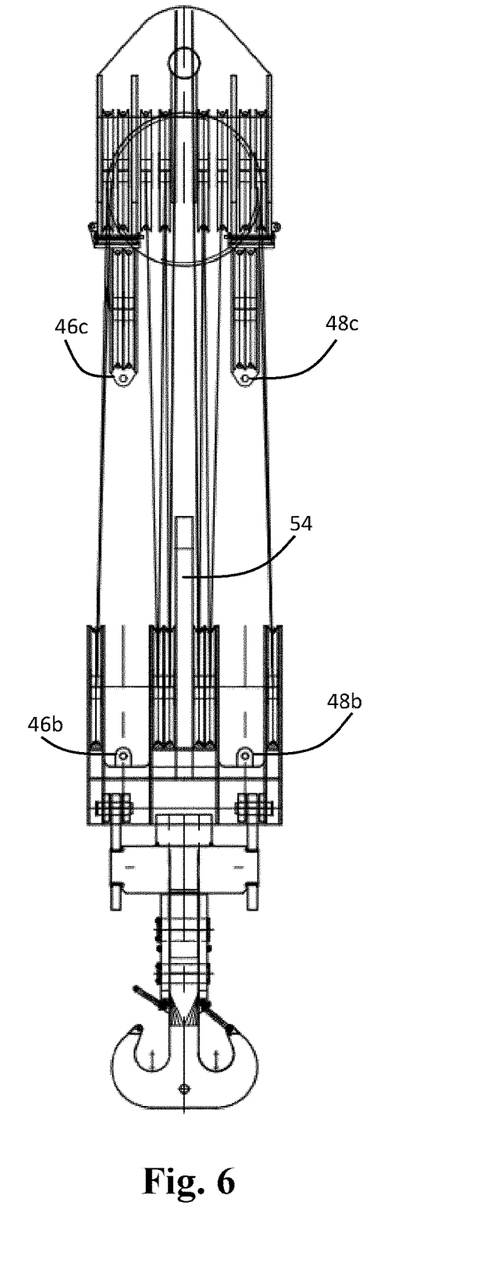
FIG. 6 shows for this embodiment the main hoisting system of FIG. 5 in a configuration with a minimum number of effective falls, showing both the single and double load suspension configurations in the same figure.
Figures 7, 8:
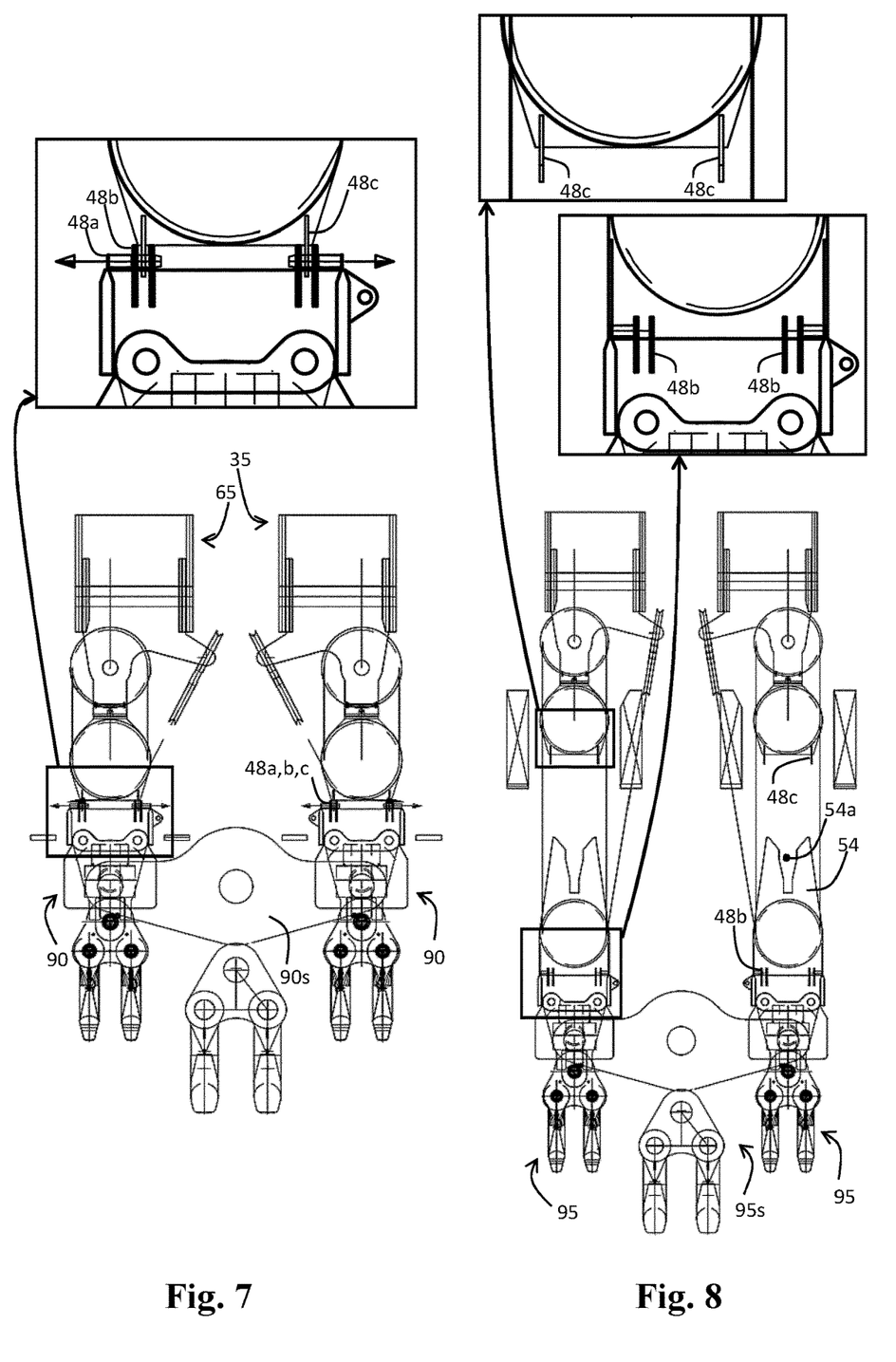
FIG. 7 shows for a second embodiment of the invention, a main hoisting system in a configuration with a maximum number of effective falls, showing both the single and double load suspension configurations in the same figure.
FIG. 8 shows for this embodiment the main hoisting system of FIG. 5 in a configuration with a minimum number of effective falls, showing both the single and double load suspension configurations in the same figure.

FIGS. 5-8 illustrate the second embodiment in two-dimensional views. FIGS. 5 and 6 are front views, and FIGS. 7 and 8 are side views. FIGS. 5 and 7 depict the hoisting capacity increasing configuration, and FIGS. 6 and 8 depict the hoisting speed increasing configuration. It is noted that the schematic illustration in FIGS. 12a,b of both hoisting configurations equally applies to this embodiment as well.

In particular, the interconnection of the first and second connection members 46b,c, 48b,c by means of the pins 46a, 48a and the engagement between the first and second positioning members 50, 51, 52, 53 by means of pins 50a, 51a is visible in more detail in FIGS. 5-8.

Most of the above discussed features of the first embodiment can be recognized in FIGS. 5-8 as well and the above discussion related thereto equally applies—so that it is not repeated here. Instead, only the features that differ from the first embodiment are discussed.

Figure 10:
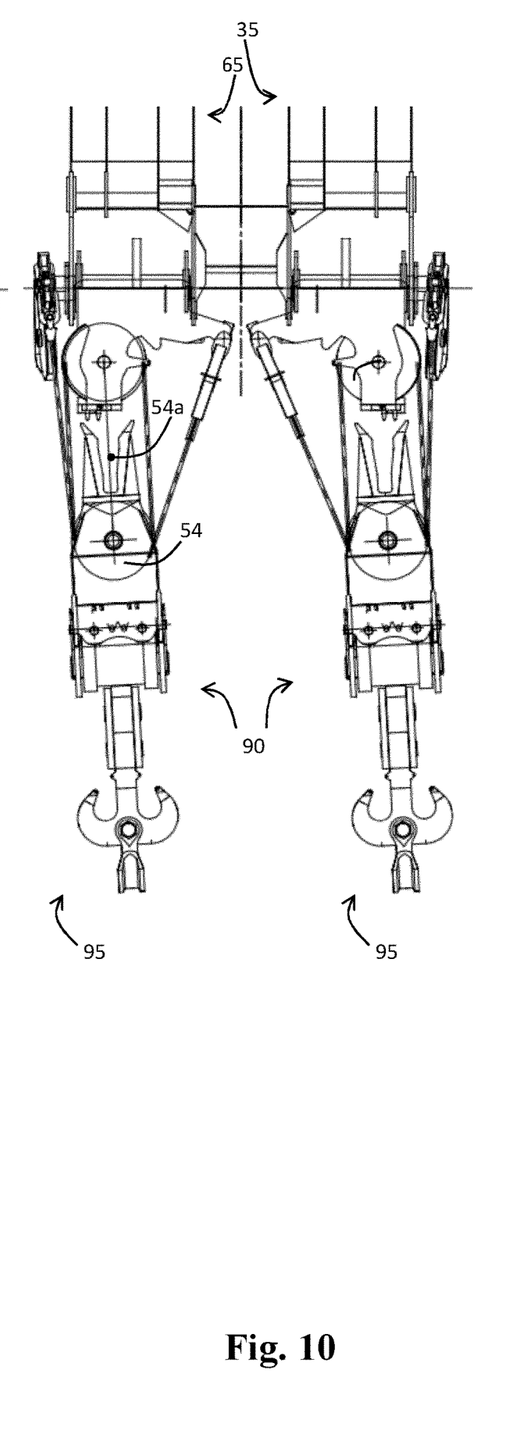
FIG. 10 shows for this embodiment the same main hoisting system in a configuration with a minimum number of effective falls, with the double load suspension configuration.
Figure 11:
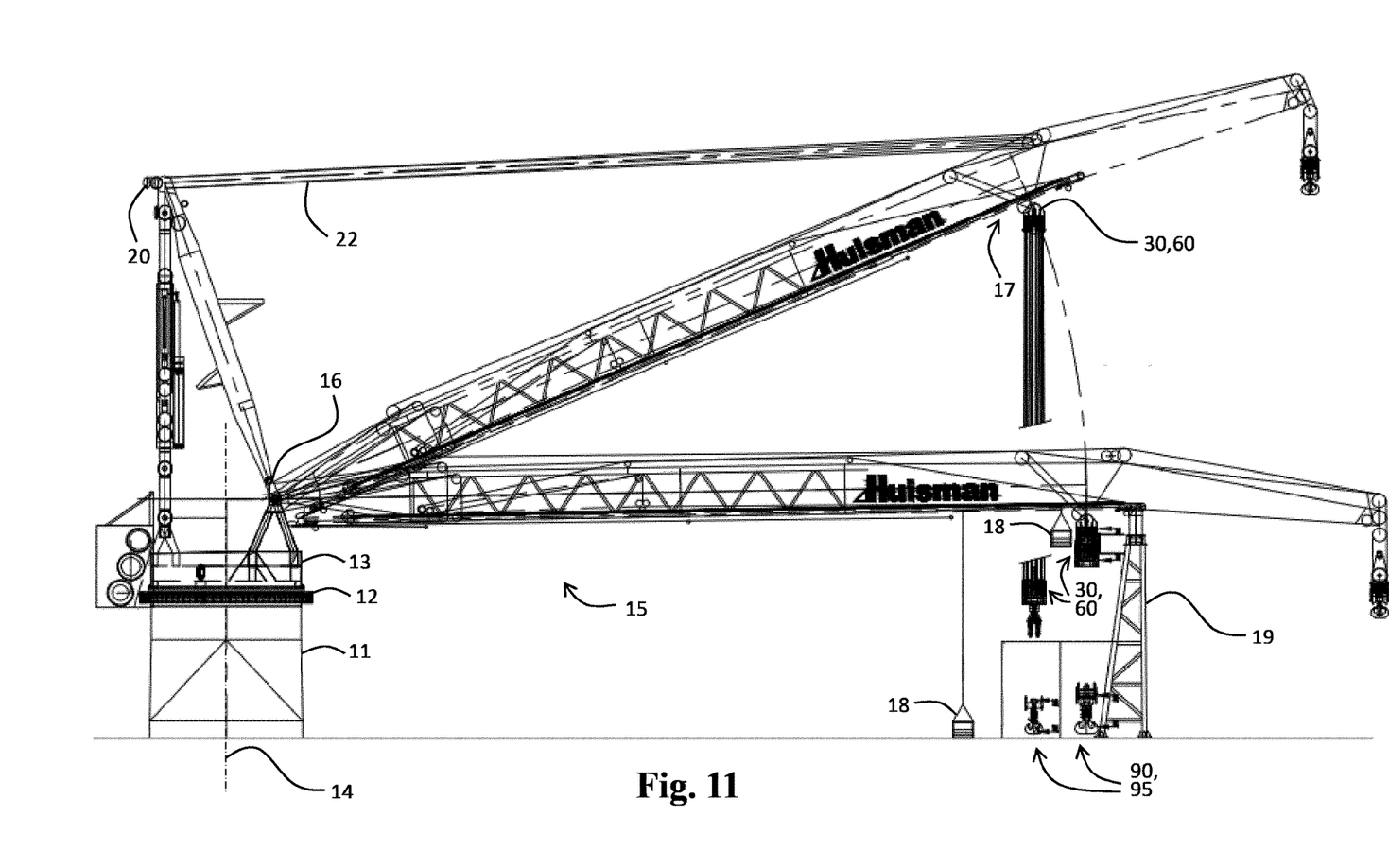
FIG. 11 shows a crane according to the invention with the main hoisting systems of FIGS. 5-10, with the single load suspension configuration, FIGS. 12a,b show schematically the hoisting system in the configurations of, respectively, FIGS. 3,5,7 and 4,6,8,9, 10.

This embodiment differs from the embodiment of FIGS. 2-4 in that the hoisting block 41 does not have the fastening ribs 41c,d, but instead enables to use a single and a double load suspension configuration. Both configurations are illustrated together in each of FIGS. 7 and 8—which presentation is only for the purpose of context. In FIGS. 9 and 10, the main hoisting systems are shown respectively in the single load suspension configuration and in the double load configuration, as is applied in practice.

In the double load suspension configuration shown in FIG. 10, a crane hook assembly 95 is attached to both respective hoisting block bodies 41 of the two hoisting block assemblies 40,70 via a respective hook connection assembly 90.

In the single load suspension configuration shown in FIG. 9, a single crane hook assembly 95 is suspended underneath a single hook connection assembly 90s, which is attached at each lateral end to a respective hoisting block body 41 so as to interconnect the hoisting block bodies 41. The connection assembly 90s is provided with a female upper connection member 90c of a connector system which is described in detail in WO2020055249 of the applicant. This female upper tool connector 90c is configured to releasably engage on the male lower tool connector 95c of the crane hook assembly 95s. In FIG. 9 the male lower tool connector 95c is connected to the female upper tool connector 90c—so as to connect the crane hook assembly 95s to the connection assembly 90s. To illustrate the connection principle of the connector system, such system as described in WO2020055249 is shown in the detail shown on the bottom-left. The detail shows a crane hook assembly 95s with male lower tool connector 95c while disconnected from the female upper connection member 90s. The crane hook assembly 95s is connectable to the connection assembly 90s by upwards insertion of the male lower tool connector 95c into the female upper tool connector 90c.

Referring again to FIGS. 5-8, this embodiment the interconnection of the first and second connection members 46b,c, 48b,c corresponds to that of the embodiment in FIGS. 2-4. FIGS. 7 and 8 show, in the top frames of the figures, details of the interconnection between the connection members 48b,c by means of the pin 48a. In FIG. 7, it is visible that the pin 48a extends through the holes formed by the portions 48b,c that form the first and second connection member, so that the portions 48b,c are interconnected. The arrows indicate the removal of these pins in order to release the interconnection, so as to enable the switch to the hoisting speed increasing configuration of FIG. 8. FIG. 8 shows that the pin has been removed from the holes, and that the portions 48b,c are separated.

Furthermore, FIGS. 7 and 8 illustrate the shape and arrangement of the protruding spacer and positioning member 54 extending towards the upper sheave block 35 and the cooperating engagement member thereof.

FIGS. 5 and 6 illustrate the insertion of pins 50a, 51a through the positioning members 50, 51, 52, 53 which are, alike the first and second connection members 46b,c, 48b,c each embodied as portions forming respective holes therein, alignable with each other such that the pins 50a, 51a extend therethrough in the hoisting speed increasing configuration shown in FIG. 6. FIG. 5 shows that here, this is done by hand from a man basket 18.

In a hoisting method, a switch is made between the hoisting capacity increasing configuration shown in FIGS. 3, 5 and 7 and the hoisting speed increasing configuration shown in FIGS. 4, 6 and 8. In practice this may be done while the boom 15 is supported by the vessel, e.g. by the boom rest 19, in the lower transport position. The hoisting block assembly is firstly hoisted up to the upper position of the hoisting block assembly 40 against the upper sheave block 35 shown in FIGS. 5 and 7 for making any switch.

To switch from the hoisting capacity increasing configuration to the hoisting speed increasing configuration, the positioning members 50, 51, 52, 53 are subsequently engaged. In these embodiments, this is done by aligning the holes formed by the portions 50, 51, 52, 53 and subsequently inserting the pins 50a, 51a as shown in FIG. 5. Furthermore the first and second connecting members 46b,c and 48b,c are disconnected. In these embodiments, this is done by removing the pins 46a, 48a as shown in FIGS. 7.

To switch from the hoisting speed increasing configuration to the hoisting capacity increasing configuration, the first and second connecting members 46b,c and 48b,c are interconnected—here by aligning the holes formed by the portions 46b,c and 48b,c and subsequently inserting the pins 46a, 48a. Furthermore the positioning members 50, 51, 52, 53 are disengaged, here by removing the pins 50a, 51a.

After making the switch, the boom 15 may be luffed and the hoisting block assembly may be lowered again to perform a hoisting job using the chosen configuration.

As illustrated in FIG. 2, and as will be understood on the basis of the disclosures of WO2017/217845 and WO2018/052291 the crane with the independently operable main hoisting systems 30, 60 allows to manipulate the upper end and lower end of the monopile 100 in the course of an up-ending process.

In an embodiment, the method for up-ending of a monopile 100, or another elongate structure, e.g. a jacket foundation or a tower of a wind turbine, comprises the following steps:
  a) providing elongate structure 100 with a first longitudinal end and a second longitudinal end in a substantially horizontal orientation;
  b) connecting the hoisting block assembly 40 of the first main hoisting system 30 to the first longitudinal end or end portion of the elongate structure 100;
  c) connecting the hoisting block assembly 80 of the second main hoisting system 60 to the second longitudinal end or end portion of the elongate structure 100;
  d) operating the respective winches 55 of the first and second main hoisting systems 30, 60 until the elongate structure is in a substantially vertical orientation with the first longitudinal end above the second longitudinal end.

In practice the method may comprise the act of disconnecting one or more of the disconnectable sheave members from the hoisting block assembly of the second main hoisting system so as to obtain an effective number of falls in the second hoisting system 60 that is lower than the effective number of falls in the first hoisting system 30.

It will be appreciated that when, as preferred, the systems 30, 60 are generally the same, it does not matter which one acts as first and second system in the upending method, noting that it is desirable to have the largest number of effective falls in the system manipulating the top of the structure and the lowest number of effective falls in the main hoisting system manipulating the second longitudinal end of the structure.

In an embodiment the step c) comprises the following steps:
- c1) providing a gripping element 110;
- c2) providing the gripping element 110 around the second longitudinal end or end portion of the elongate structure 100; and
- c3) connecting the hoisting block assembly 80 of the hoisting system to the gripping element.

It will be appreciated that the crane 10 can also be used for other hoisting jobs, e.g. related to the installation of an offshore wind turbine. For example, the crane can be used for hoisting the nacelle on top of the tower, for hoisting blades of the wind turbine, etc.

The invention claimed is:

1. A crane comprising:
   a boom pivotal about a horizontally oriented boom pivot axis;
   a luffing system configured to set an angular orientation of the boom; and
   a first main hoisting system and a second main hoisting system, the first and second main hoisting systems being configured for independent operation,
   wherein each of the first and second main hoisting systems comprise:
      a hoisting cable;
      an upper sheave block with sheaves that are rotatable about a sheave rotation axis, the upper sheave block being arranged on the boom;
      a hoisting block assembly suspended from the upper sheave block by the hoisting cable in a multiple fall configuration; and
      a hoisting winch configured to lift and lower the hoisting block assembly by hauling in or paying out the hoisting cable,
   wherein the upper sheave blocks of the first and second main hoisting systems are each independently pivotable about a common pivot axis relative to the boom, the common pivot axis being parallel to the pivot axis of the boom, and wherein the sheave rotation axis of the sheaves of each of the upper sheave blocks is perpendicular to the common pivot axis of the upper sheave blocks,
   wherein each hoisting block assembly comprises:
      a hoisting block body configured to suspend a load from the hoisting block assembly;
      multiple fixed sheaves, that are fixed on the hoisting block body; and
      multiple disconnectable sheave members, each of the disconnectable sheave members comprising a frame and at least one sheave rotatably supported by the frame,
   wherein the frame of each of the disconnectable sheave members is provided with a first connector member and wherein the hoisting block body is provided with an associated second connector member, said first and second connector members being configured to provide a releasable connection between the sheave member and the hoisting block body, and wherein the frame of each of the disconnectable sheave members is provided with a first positioning member and wherein the upper sheave block is provided with an associated second positioning member, so that each of the disconnectable sheave members is selectively operable in a hoisting capacity increasing configuration, wherein the first and second connector members are interconnected and the disconnectable sheave member is connected to the hoisting block body, or in a hoisting speed increasing configuration, wherein the first and second connector members are disconnected and wherein the first and second positioning members are engaged, so that the disconnectable sheave member rests against the upper sheave block.

2. The crane according to claim 1, wherein the hoisting block body has a length parallel to the sheave rotation axis of the sheaves and has longitudinal ends, wherein a first set of one or more fixed sheaves is arranged in proximity of one longitudinal end, and wherein a second set of one or more fixed sheaves is arranged in proximity of another longitudinal end, wherein a third set of one or more fixed sheaves is arranged intermediate the first and second sets, and wherein at least one second connector member for a first of the disconnectable sheave members is arranged between the first and third sets, and wherein at least one second connector member for a second of the disconnectable sheave member is arranged between the third and second sets.

3. The crane according to claim 2, wherein the hoisting cable of each main hoisting system has a dead end secured to the boom, and wherein the hoisting cable extends from said dead end to the third set of fixed sheaves, and from there via the upper sheave block to the first disconnectable sheave member, and from there via the upper sheave block to the first set of fixed sheaves, wherein the main hoisting system comprises an equalizer sheave mounted on the upper sheave block, and wherein the hoisting cable extends from the first set of fixed sheaves via the equalizer sheave to the second set of fixed sheaves, and from there via the upper sheave block to the second disconnectable sheave block, and from there via the upper sheave block to the third set of fixed sheaves, and from said third set of fixed sheaves to an upper guide block mounted to the upper sheave block, and from there to the hoisting winch.

4. The crane according to claim 2, wherein the first, second, and third set of fixed sheaves each have two sheaves, and/or wherein the first and second disconnectable sheave blocks each have two sheaves.

5. The crane according to claim 1, wherein the hoisting block body is provided with a protruding spacer and positioning member that extends towards the upper sheave block and wherein the upper sheave block is provided with a cooperating engagement member, so that the hoisting block assembly is hoistable into a storage position in proximity of the upper sheave block, wherein the protruding spacer and positioning member abuts the cooperating engagement member.

6. The crane according to claim 5, wherein the hoisting block body has a length parallel to the sheave rotation axis of the sheaves and has longitudinal ends, wherein a first set of one or more fixed sheaves is arranged in proximity of one longitudinal end, and wherein a second set of one or more fixed sheaves is arranged in proximity of another longitudinal end, wherein a third set of one or more fixed sheaves is arranged intermediate the first and second sets, and wherein at least one second connector member for a first of the disconnectable sheave members is arranged between the first and third sets, and wherein at least one second connector member for a second of the disconnectable sheave member is arranged between the third and second sets, and wherein the protruding spacer and positioning member is located in between the sheaves of the third set of fixed sheaves.

7. The crane according claim 1, wherein the hoisting block body has parallel and horizontally extending fastening ribs protruding from a lower side of the hoisting block body, said fastening ribs being provided with multiple holes perpendicular to the ribs.

8. The crane according to claim 7, wherein the crane comprises a hook connection assembly comprising a horizontal axle supported at ends thereof by a pair of support plates having aligned bores into which the axle extends, said support plates being secured releasably on opposite sides of a fastening rib, wherein the axle has a central vertical bore through which a swivel shaft is suspended, said swivel shaft supporting a crane hook assembly.

9. The crane according to claim 1, wherein the first and second main hoisting systems have the same multiple fall configuration between the respective upper sheave block and the respective hoisting block assembly.

10. The crane according to claim 1, wherein the crane comprises:
a base structure;
a slew bearing; and
a crane housing mounted to the base structure via the slew bearing to allow the crane housing to rotate relative to the base structure about a vertical slewing axis,
wherein the boom is mounted to the crane housing and pivotal relative to the crane housing about the horizontally oriented boom pivot axis.

11. A vessel comprising the crane according to claim 1.

12. The vessel according to claim 11, wherein the vessel is a jack-up vessel comprising:
a hull, wherein the crane is mounted on the hull;
at least three jack-up legs; and
a leg driving device per leg allowing to move the corresponding leg relative to the hull in a vertical direction to allow the hull to be lifted out of the water and/or to stabilize the hull when performing a hoisting activity using the crane.

13. The vessel according to claim 12, wherein the base structure and the crane housing of the crane are arranged around a jack-up leg, so that the crane is a leg-encircling crane.

14. A method for up-ending an elongate structure, wherein use is made of the crane according to claim 1, said method comprising the following steps:
a) providing an elongate structure with a first longitudinal end and a second longitudinal end in a substantially horizontal orientation;
b) connecting the hoisting block assembly of the first main hoisting system to the first longitudinal end or end portion of the elongate structure;
c) connecting the hoisting block assembly of the second main hoisting system to the second longitudinal end or end portion of the elongate structure;
d) operating the respective winches of the first and second main hoisting systems until the elongate structure is in a substantially vertical orientation with the first longitudinal end above the second longitudinal end.

15. The method according to claim 14, wherein the method comprises:
disconnecting one or more of the disconnectable sheave members from the hoisting block body of the second main hoisting system so as to obtain an effective number of falls in the second hoisting system that is lower than the effective number of falls in the first hoisting system.

16. The method according to claim 14, wherein the step c) comprises the following steps:
c1) providing a gripping element;
c2) providing the gripping element around the second longitudinal end or end portion of the elongate structure; and
c3) connecting the hoisting block assembly of the second main hoisting system to the gripping element.

17. The method according to claim 16, wherein the elongate structure is a monopile as foundation of an offshore wind turbine or a tower of a wind turbine.

* * * * *